(12) United States Patent
Van Pelt et al.

(10) Patent No.: US 8,492,165 B2
(45) Date of Patent: Jul. 23, 2013

(54) MICROFLUIDIC INTERFACE

(75) Inventors: Colleen K. Van Pelt, Groton, NY (US); Thomas Corso, Groton, NY (US)

(73) Assignee: CorSolutions, LLC, Groton, NY (US)

( * ) Notice: Subject to any disclaimer, the term of this patent is extended or adjusted under 35 U.S.C. 154(b) by 0 days.

(21) Appl. No.: 12/868,467

(22) Filed: Aug. 25, 2010

(65) Prior Publication Data

US 2011/0048952 A1 Mar. 3, 2011

Related U.S. Application Data

(60) Provisional application No. 61/238,778, filed on Sep. 1, 2009.

(51) Int. Cl.
*G01N 15/06* (2006.01)
*G01N 33/00* (2006.01)
*G01N 33/48* (2006.01)

(52) U.S. Cl.
USPC .......... 436/180; 422/68.1; 422/502; 422/503; 422/504; 422/509; 422/501; 436/43; 29/592

(58) Field of Classification Search
USPC ... 422/68.1, 502, 503, 504, 509, 501; 436/43, 436/180; 29/592
See application file for complete search history.

(56) References Cited

U.S. PATENT DOCUMENTS

| | | | |
|---|---|---|---|
| 6,273,478 B1 | 8/2001 | Benett et al. | |
| 6,319,476 B1 | 11/2001 | Victor, Jr. et al. | |
| 6,772,653 B1 | 8/2004 | Franksson | |
| 7,028,536 B2 | 4/2006 | Karp et al. | |
| 7,311,882 B1 * | 12/2007 | Renzi | 422/546 |
| 7,351,380 B2 * | 4/2008 | Simmons et al. | 422/502 |
| 7,553,455 B1 * | 6/2009 | Renzi et al. | 422/546 |
| 7,641,242 B2 * | 1/2010 | Van Pelt | 285/384 |
| 7,766,033 B2 * | 8/2010 | Mathies et al. | 137/297 |
| 7,790,124 B2 * | 9/2010 | Matteo | 422/240 |
| 7,799,553 B2 * | 9/2010 | Mathies et al. | 435/283.1 |
| 8,163,254 B1 * | 4/2012 | Renzi et al. | 422/502 |
| 2002/0092273 A1 * | 7/2002 | Nygaard Jensen et al. | 53/459 |
| 2007/0003447 A1 | 1/2007 | Gleason et al. | |
| 2008/0131327 A1 | 6/2008 | Van Dam et al. | |
| 2011/0200432 A1 * | 8/2011 | Alamsetty et al. | 415/230 |

OTHER PUBLICATIONS

International Search Report for International Patent Application No. PCT/US2010/046661 (Mar. 31, 2011).
Written Opinion of the International Searching Authority for International Patent Application No. PCT/US2010/046661 (Mar. 31, 2011).

* cited by examiner

*Primary Examiner* — Brian J Sines
(74) *Attorney, Agent, or Firm* — Joseph M. Noto; Bond Schoeneck & King PLLC

(57) ABSTRACT

The method for making microfluidic connections includes the steps of providing a system including a base, a movable device in communication with the base, and a sealing component attached to the movable device; delivering a microfluidic device to the base; aligning the sealing component and the microfluidic device, wherein the moveable device is capable of adjustably positioning the sealing component and capable of optical alignment, to bring the sealing component and the microfluidic device into fluid communication; and compressing the sealing component and the microfluidic device into contact thereby forming a microfluidic connection by creating a leak-resistant seal between at the interface of the sealing component and the microfluidic device.

22 Claims, 20 Drawing Sheets

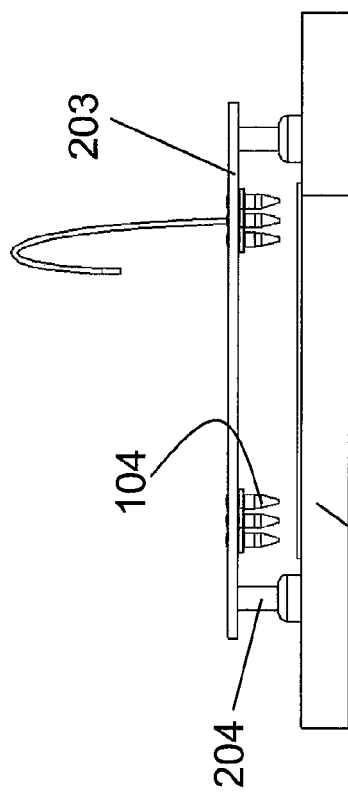
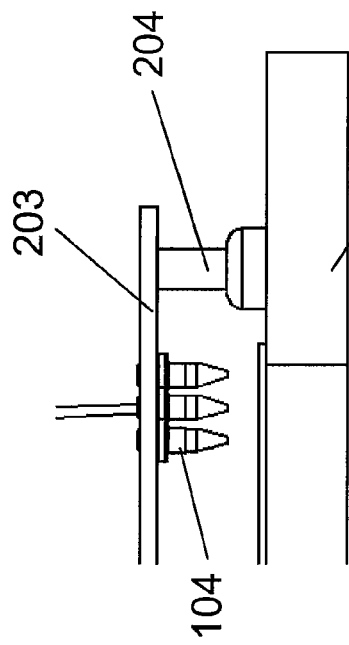
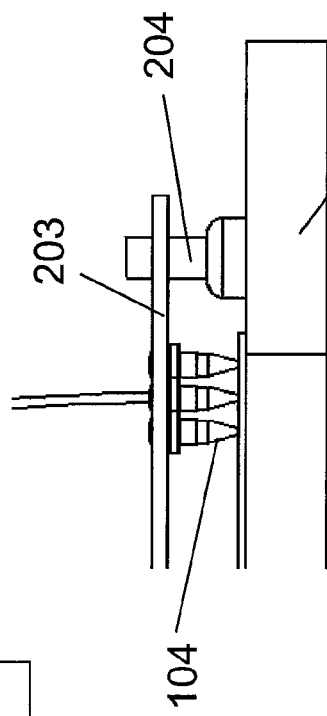
Figure 6A
Figure 6B
Figure 6C

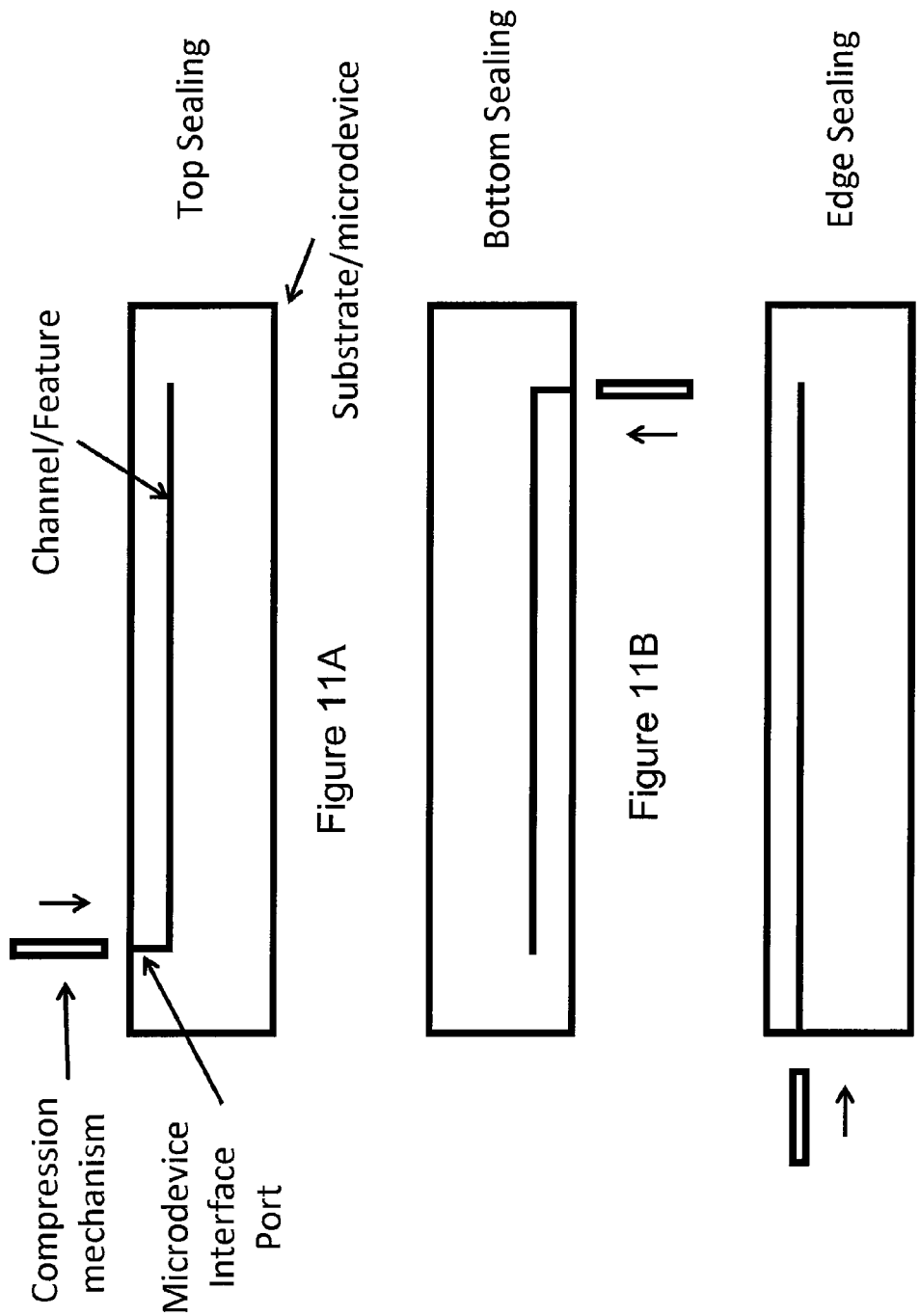

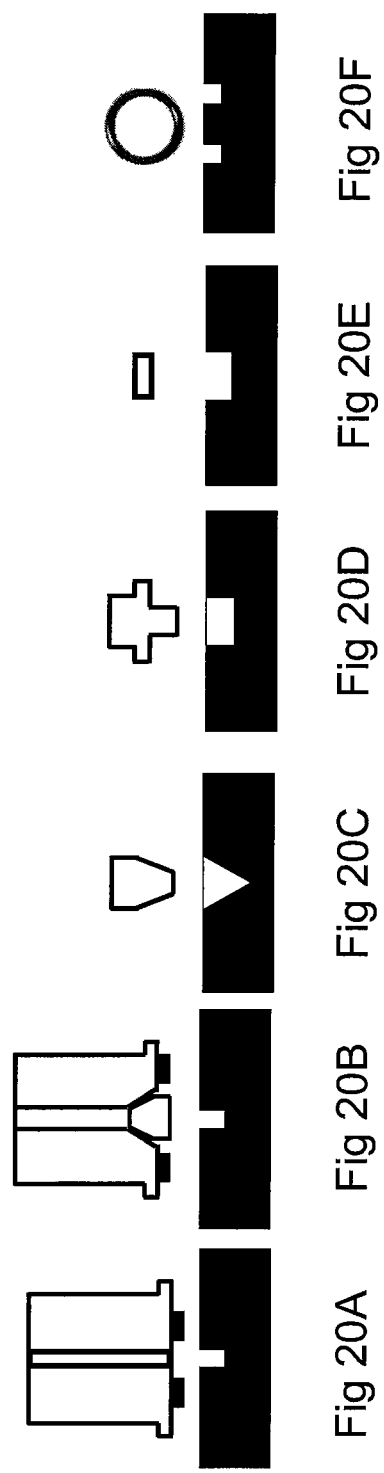

MICROFLUIDIC INTERFACE

CROSS-REFERENCE TO RELATED APPLICATIONS

This application claims priority from U.S. Provisional Patent Application Ser. No. 61/238,788, filed Sep. 1, 2009, the contents of which are hereby incorporated by reference in their entirety.

FIELD OF THE INVENTION

This invention relates to creating a microfluidic connection on a microfluidic device.

BACKGROUND OF THE INVENTION

Advances in microfluidics technology are revolutionizing molecular biology procedures for enzymatic analysis (e.g., glucose and lactate assays), DNA analysis (e.g., polymerase chain reaction and high-throughput sequencing), and proteomics. The basic idea of microfluidic biochips is to integrate assay operations such as detection, sample pre-treatment and sample preparation on a single microchip. An emerging application area for biochips is clinical pathology, especially the immediate point-of-care diagnosis of diseases. In addition, microfluidics-based devices, capable of continuous sampling and real-time testing of air/water samples for biochemical toxins and other dangerous pathogens, can serve as an always-on "bio-smoke alarm" for early warning. Low flow separation techniques, such as capillary electrophoresis, capillary electrochromatograghy, and low flow HPLC are further emerging applications.

A lab-on-a-chip (LOC) is a device that integrates one or several laboratory functions on a single chip of only millimeters to a few square centimeters in size. LOCs deal with the handling of extremely small fluid volumes down to less than pico liters. Lab-on-a-chip devices are a subset of Microelectromechanical Systems (MEMS) devices and are often indicated by "Micro Total Analysis Systems" (μTAS) as well. Microfluidics is a broad term that includes mechanical flow control devices like pumps, valves and sensors such as flow meters and viscometers. "Lab-on-a-Chip" generally relates to the scaling of single or multiple lab processes down to chip-format, whereas "μTAS" is dedicated to the integration of the total sequence of lab processes to perform chemical analysis.

μTAS technologies are suitable for applications other than just analysis. For example, channels (capillary connections), mixers, valves, pumps and dosing devices are all suitable μTAS technologies.

The first LOC analysis system was a gas chromatograph, developed in 1975 by S. C. Terry—Stanford University. However, it was not until the end of the 1980's, and beginning of the 1990's, that LOC research started to seriously grow. The development of micropumps, flow sensors and the concepts for integrated fluid treatments for analysis systems was spurred by this research. These μTAS concepts demonstrated that integration of pre-treatment steps, usually done at lab-scale, could extend the simple sensor functionality towards a complete laboratory analysis, including additional cleaning and separation steps.

A big boost in research and commercial interest came in the mid 1990's, when μTAS technologies turned out to provide interesting tooling for genomics applications such as capillary electrophoresis and DNA microarrays. Another boost in research support came from the military, especially from DARPA (Defense Advanced Research Projects Agency), for their interest in portable bio/chemical warfare agent detection systems. The added value was not only limited to integration of lab processes for analysis but also the characteristic possibilities of individual components and the application to other, non-analysis, lab processes. Hence the term "Lab-on-a-Chip" was introduced.

Although the application of LOCs is still novel and modest, a growing interest of companies and applied research groups is observed in different fields such as analysis (e.g. chemical analysis, environmental monitoring, medical diagnostics and cellomics) but also in synthetic chemistry (e.g. rapid screening and microreactors for pharmaceutics). Further application developments, research in LOC systems is expected to extend towards downscaling of fluid handling structures as well, by using nanotechnology. Sub-micrometer and nano-sized channels, DNA labyrinths, single cell detection analysis and nano-sensors are feasible for interaction with biological species and large molecules.

Despite the immense amount of research around creating the chips themselves, interfacing to the real world, the "Chip-to-World" interface technology, has been limited. Progress to interface to the LOCs has progressed slowly. This invention serves as a means to make connections to microchips and similar-based microfluidic devices.

Lab-on-a-chip technology may be used to improve global health, particularly through the development of point-of-care testing devices. In countries with few healthcare resources, infectious diseases that would be treatable in a developed nations are often deadly. In some cases, poor healthcare clinics have the drugs to treat a certain illness but lack the diagnostic tools to identify patients who should receive the drugs. LOC technology may be the key to provide powerful new diagnostic instruments. The goal of these researchers is to create microfluidic chips that will allow healthcare providers in poorly equipped clinics to perform diagnostic tests such as immunoassays and nucleic acid assays without additional laboratory support.

The basis for most LOC fabrication processes is photolithography. Initially most processes were in silicon, as these well-developed technologies were directly derived from semiconductor fabrication. Because of demands for e.g. specific optical characteristics, bio- or chemical compatibility, lower production costs and faster prototyping, new processes have been developed such as glass, ceramics and metal etching, deposition and bonding, PDMS processing (e.g., soft lithography), thick-film- and stereolithography as well as fast replication methods via electroplating, injection molding and embossing. Furthermore, the LOC field more and more exceeds the borders between lithography-based microsystem technology, nanotechnology and precision engineering.

LOCs may provide advantages, which are specific to their application. Typical advantages of LOC systems include:
 low fluid volumes consumption (less waste, lower reagents costs and less required sample volumes for diagnostics);
 faster analysis and response times due to short diffusion distances, fast heating, high surface to volume ratios, small heat capacities;
 better process control because of a faster response of the system (e.g. thermal control for exothermic chemical reactions);
 compactness of the systems due to integration of much functionality and small volumes;
 massive parallelization due to compactness, which allows high-throughput analysis;
 lower fabrication costs, allowing cost-effective disposable chips, fabricated in mass production; and safer platform for chemical, radioactive or biological studies because of integration of functionality, smaller fluid volumes and stored energies.

To interface microchips to their supporting hardware systems remains a significant challenge. And the lack of robust, reliable technology to make these connections has not only slowed microfluidic research, but is preventing chip-based solutions from being applied to real world applications. While extensive research effort has been directed toward microchip performance and fabrication, very little effort has been focused on technologies to interface these chips to fluidic and electronic hardware. The end result is that microchip performance is often compromised due to the underdeveloped interface technology.

One method to make a fluidic connection to a chip is by use of a custom housing to clamp the connection. In FIGS. 1A-1B there is shown a custom made housing 10 to effect a connection. A microchip 11 rests in a bottom plate 12, the bottom plate being specifically designed to house the microchip 11. Fittings 13 are attached to the top plate 14, the fittings 13 being designed to effect a fluidic connection to the microchip. A gasket 15 is placed between the fittings 13 and the channel port 16 in microchip 11. The top plate 14 is then placed on the bottom plate 12 and the screws 17 are threaded into the threaded receiver 18 to compress the gasket 15 as shown in FIG. 1B. The problem with clamping systems is that the housing must be custom made for each microchip design. Also, this approach seals all fittings on the microchip, offering no independent control. Furthermore, the sealing plate may block the view or access to regions of interest on the microfluidic device. This approach is also problematic for large surfaces as the plate must be sufficiently rigid and thick to provide ample sealing force, and over a large surface area the sealing force would vary too greatly to create an effective seal.

The most common approach for making connections between fluidic sources and chip-based devices is the manual process of adhesion or "gluing" of polymer fittings or wells to the ports on a chip. In FIGS. 2A-2C there is shown a fitting being bonded to a microchip. An adhesive 21 is placed around the opening on the microchip 22. A fitting 23 having a gasket 24 is then pressed onto the adhesive 21. Clamps 25 are then attached to the fitting 23 to compress the adhesive 21 while it dries. This is a time consuming process that requires extreme skill on the part of the user. Furthermore, the adhesive may leach into the fluid, thereby contaminating the system. Over time the adhesive degrades and the fitting may develop leaks. This conventional process has many drawbacks including: the connections are permanent, it is a labor and time intensive process, it is only amenable to certain substrate materials, and it can not be automated.

Adhesion approaches have additional shortcomings. The process requires exceptional hand-to-eye coordination for both the fitting placement, as well as the subsequent physical clamping of the parts for the drying or curing step. Also, the curing process generally requires heat, so that heat-sensitive material or chemistries cannot be placed in the microchip features prior to adhering the fittings, complicating manufacturing processes. The curing process involves cross-linking of reactive organic species such as epoxies, which slowly leach out of solution following prolonged exposure to solvents. For extremely sensitive analyses, this leaching can lead to false positives in organic detection. Furthermore, the conventional fittings are relatively large in dimension to allow for hand manipulation, however this results in the fittings covering a large amount of precious area on the microchip, affecting the feature densities and the channel architectures. Additionally the large fittings create excessive fluid dead volumes which negatively impact microchip performance and separation quality. The large dead volume also increases the fluid delivery time to the chip. The adhesion approach fatigues overtime, resulting in fluid leakage and subsequent failure of the microchip device. Effective adhesion requires a compatible microchip substrate material. Therefore when using adhesion, chips cannot be made from certain otherwise desirable materials such as Teflon and polypropylene. When adhered fittings are used, the amount of fluid pressure that a microchip can receive is realistically limited to hundreds of PSI, however HPLC and CEC applications should ideally operate at 1000's of PSI fluid pressure. Consequently if the pressure used is too low, the separation performance is compromised, and if the pressure used is too high, the fitting will detach, leakage will occur, and device failure will result. Even if the device has a plurality of fittings, if a single fitting fatigues or fails, the microchip device may be rendered useless. Adhered fittings are, for practical purposes, permanent and cannot be removed. Adhered fitting connections cannot be made in an automated fashion.

With these limitations of the conventional technology, it is apparent that a novel means of interfacing microchips with their supporting hardware is critically needed. To meet this need, a fluidic probe system capable of making automated, non-permanent, low and high pressure connections to microfluidic chip-based devices without the use of bonding or adhering is used. Connections are made using a compression device equipped with a dynamic force monitoring and compensation mechanism, allowing for precise, robust, repeatable connections. This compensation mechanism ensures leak-free operation, even in the event of temperature cycling or material fatigue. Optionally, the device contains an integrated means of leak sensing.

Therefore, a device that can interface microchips with supporting hardware is desired.

Furthermore, a system that is capable of making high and low pressure fluidic connections to microchips and microfluidic devices is desired.

Even further, a system that can provide electrical potentials to interface optics and external hardware to microchips and devices is desired.

SUMMARY OF THE INVENTION

The invention comprises, in one form thereof, a means to make connections to microchips and similar-based microfluidic devices. More particularly, the present invention provides a device that allows for manual or automated microfluidic connections without the need for user expertise in making difficult and critical fluidic connections. Additional process steps such as adhering fittings or gluing connections to microchips are eliminated.

Although various adhesive, bonding, and clamping systems have attempted to make connections from external devices/structures to microchip-based devices, there is still no simple, robust system with easy to change components and integrated diagnostic sensors for identifying malfunctions in these dynamic fluidic systems. The invention, in one form thereof, addresses this limitations and provides a simple mechanism for creating a non-permanent, leak-resistant seal to a microfluidic structures. The microfluidic structures including microchips, wafers, dies, or other similar components for making low and high pressure connections.

In one form, the system comprises a fluid source, telescoping connections, and a wafer, die or microchip. The wafer, die or microchip contains one or more fluid inlets and one or more fluid outlets. The wafer, die or microchip is placed in or on a receiving feature. Telescoping arms access inlet and outlet ports located at any position on the wafer, die or microchip. On each arm a sealing fitting, ferrule, coned port, flat-bottom fitting, gasket, o-ring or flange mates to the ports on the wafer, die or microchip. Alignment of the arm to the inlet and/or outlet ports can be performed by human eye or by an optical magnification system. The sealing fitting, ferrule, coned port, flat-bottom fitting, gasket, o-ring or flange on the arm is engaged to connect to the port on the wafer, die or microchip. Optionally, a drive mechanism applies a pre-determined, controlled force to effect this connection. Subsequently, the arms are engaged and bring the sealing surface or material in contact with the micro device port. Upon engagement, a leak-tight seal is formed with the wafer, die or microchip. Fluid delivered by the fluid source is transported to and from the wafer, die or microchip via the arms and the inlet and outlet ports. Optionally, a voltage is applied to the wafer, die, or microchip via the arms and the inlet and outlet ports. The voltage is useful for generating electric fields and field gradients. These fields are practical in separating molecules using CE, CEC, CZE, etc. Voltage is also useful for electrochemistry experiments and for generating an electrospray. It is understood that engagement of the ports on the wafer, die or microchip may be in any orientation, including from the top, bottom or side. In one embodiment, the arm directs the flow or voltage from an outlet port to a detector, such as a fluorescence, conductivity, UV or mass spectrometer, or subsequent processing or collection device or vessel. Once the arms are engaged to the ports, an analysis or process is performed. At the completion of the analysis, either additional analyses are performed, or the arms are disengaged from the wafer, die or microchip. The wafer, die or microchip is then removed. The connections are not permanent, thereby allowing for the microchip to be removed from the system. The connections are made by applying a controlled axial force. This is in contrast to a manual twisting motion used with threaded fittings, where a user is at risk of over- or under-tightening the connection or damaging fragile ports.

A dynamic force compensation mechanism ensures that the applied sealing force is always maintained. This eliminates the possibility of leak formation due to material fatigue, cold flow or drastic temperature changes. This is especially important for long term use or when experiencing temperature fluctuations that would result in compression force changes and development of leaks at the sealing interfaces.

No heat is required for connections to be established. Therefore, heat-sensitive material or chemistries can be placed in the microchip features prior to making the connections, simplifying manufacturing processes.

Because epoxy is not needed, adhesion chemicals are not introduced to the surface of the microchip which can create background contamination when the microchip is in the presence of a highly sensitive detector such as laser fluorescence and mass spectrometer. This further allows for connections to virtually any substrate material.

Because the sealing fittings are positioned on a movable device, they can be positioned around the circumference of the microchip. This flexible design will allow for a single support hardware system to be compatible with many microchip architectures, offering a universal means of positioning fluid and electrical probes. This allows for fluid introduction and/or electrical potential to be applied to any given port on the microchip.

The system will allow for microchips to be comparison tested. The reproducible, non-permanent connections will allow for microfluidic performance testing by removing any variation introduced from the manually adhered fittings.

In another form, the invention utilizes diagnostic sensors for detecting leaks or as part of an analysis or detector system.

In one embodiment, the invention provides a method to diagnose very small fluidic leaks and nanoflow electrospray failures at the component and system level for conventional and chip-based microfluidics.

An advantage of the present invention, is that the system provides an improved fluidic connections to microchips.

A further advantage of the present invention, is that the fluidic connections do not require the use of epoxies which may leach or degrade over time. The lack of epoxy makes the system compatible with any fitting material and any microfluidic device material. The fitting does not need space or features for any adhesive material.

An even further advantage of the present invention, is that the same connecting device can be used to make numerous connections without the need for replacement.

Yet a further advantage of the present invention, is that compression seals can be made to ports located at any position on the chip and that the connections are not permanent.

The invention allows for the formation of robust, reproducible, non-permanent connections to microchips. The connections are formed using either indexing arms or multiple fitting holder heads which are capable of forming a compression seal to a port located at any position on the surface of the microchip. The sealing force is user-defined and can be tightly controlled with integrated force sensors. In addition, the sealing force is monitored with a force sensor and force compensation mechanism ensuring that the desired force is maintained. The device is compatible with all microchip architectures. Alterations to the microchip surface is avoided as connections are established using instrumentation rather than processing steps. Further, the process is automatable allowing for exchanging microchips and subsequently creating electrical and fluidic connections in an automated fashion. Optionally, the integration of leak sensors to monitor leaks are included.

BRIEF DESCRIPTION OF THE DRAWINGS

The present invention is disclosed with reference to the accompanying drawings, wherein:

FIG. 6A is a side view of the microfluidic system as shown in FIG. 5;

FIG. 6B is a close up side view of the connector plate shown in FIG. 6A in the open position;

FIG. 6C is a close up side view of the connector plate shown in FIG. 6A in the closed position;

FIGS. 11A-11C demonstrate that the fluidic connection can be made on any portion of the microchip;

FIGS. 20A-20F demonstrate a variety of suitable fitting mechanisms.

Corresponding reference characters indicate corresponding parts throughout the several views. The examples set out herein illustrate several embodiments of the invention but should not be construed as limiting the scope of the invention in any manner.

DETAILED DESCRIPTION

Figure 1A:
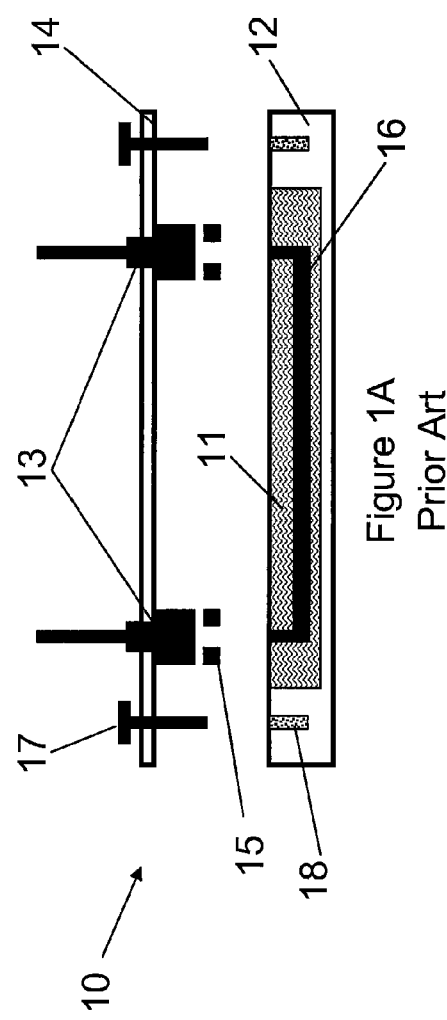
FIGS. 1A-1B demonstrate clamping a fitting to a microchip in a custom housing according to the prior art.
Figure 1B:
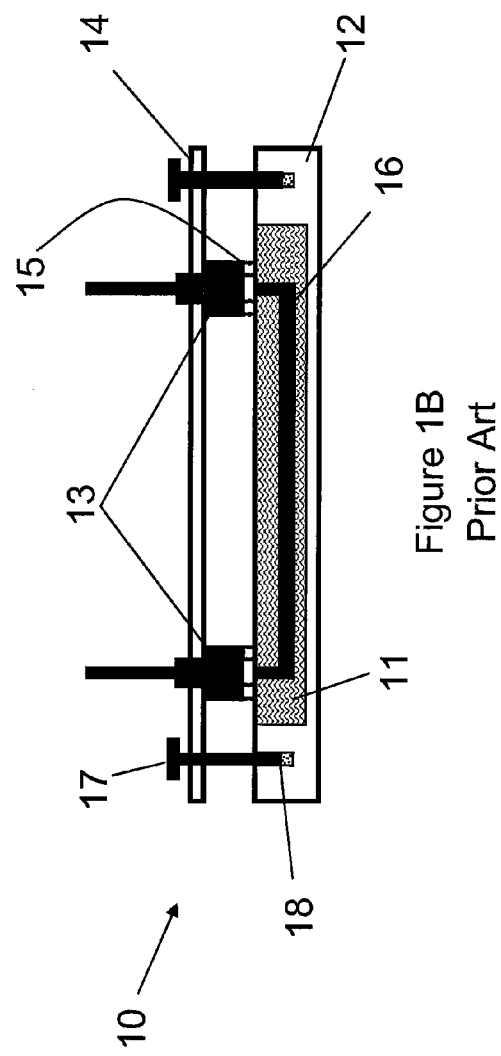
Figure 2C:
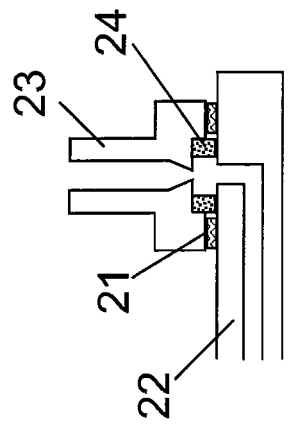
FIGS. 2A-2C demonstrate the gluing of a fitting to a microchip according to the prior art.
Figure 2B:
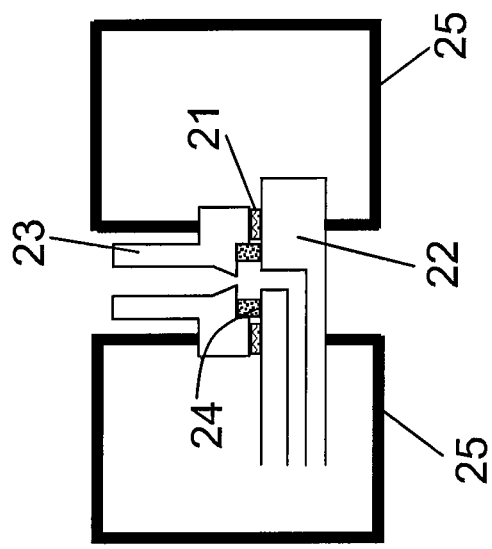
Figure 2A:
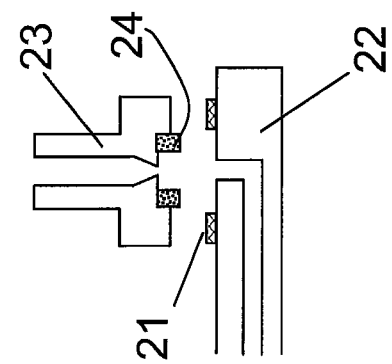
Figure 3:
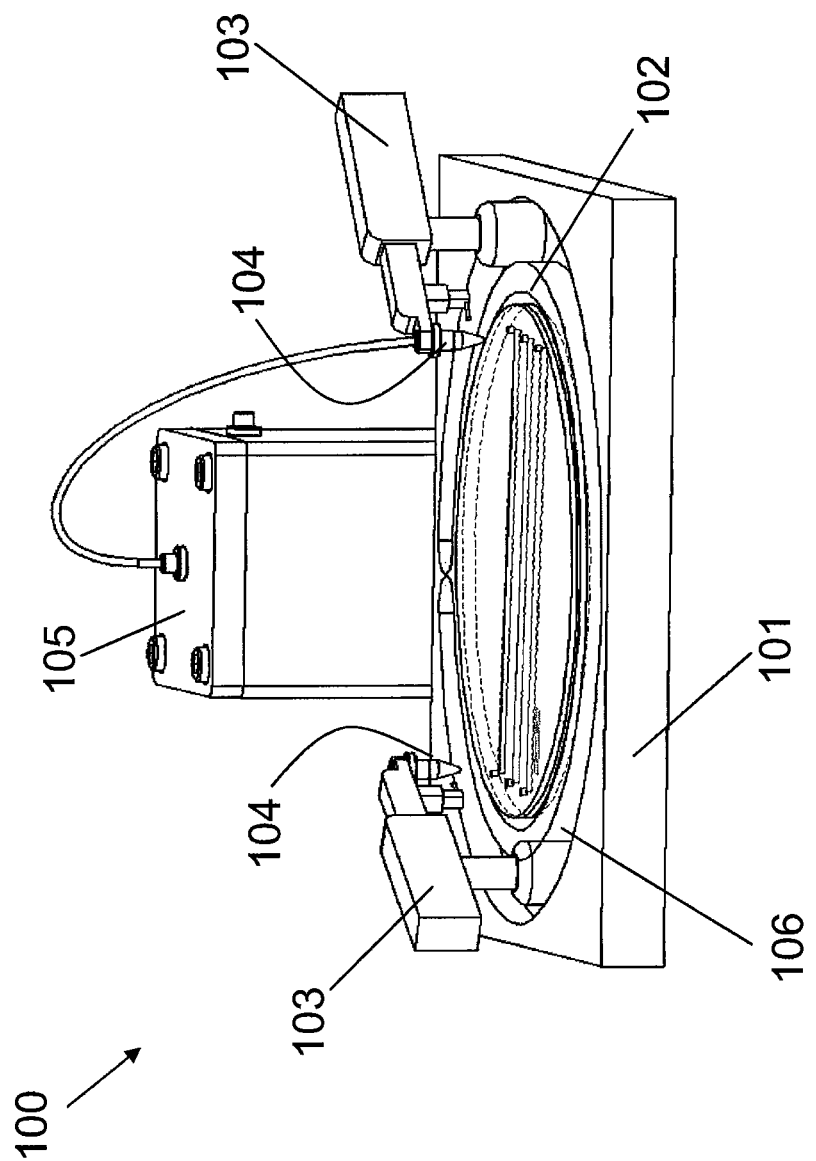
FIG. 3 is an isometric view of a microfluidic system having a plurality of connector arms according to one embodiment.
Figure 4B:
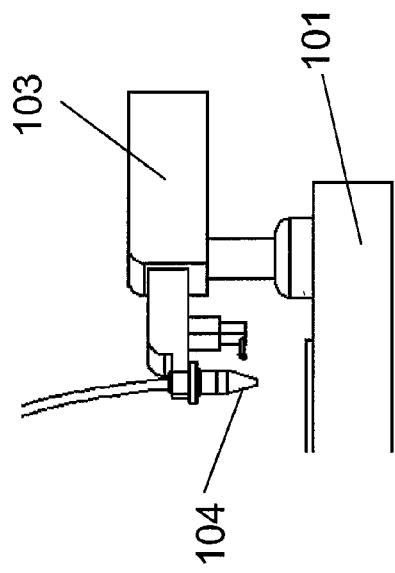
FIG. 4B is a close up side view of the connector arm shown in FIG. 4A in the open position.
Figure 4C:
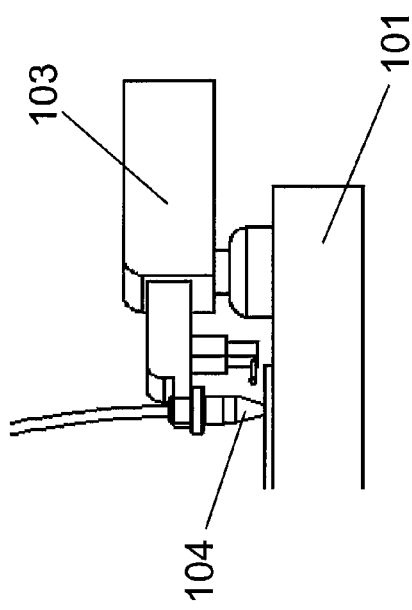
FIG. 4C is a close up side view of the connector arm shown in FIG. 4A in the closed position.
Figure 4A:
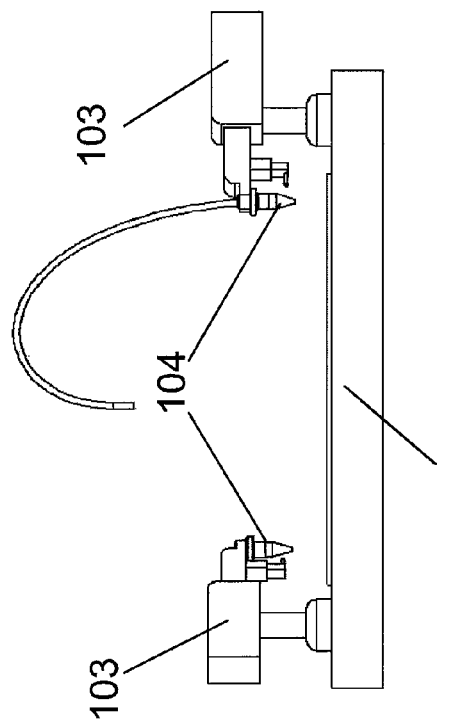
FIG. 4A is a side view of the microfluidic system as shown in FIG. 3.
Figure 5:
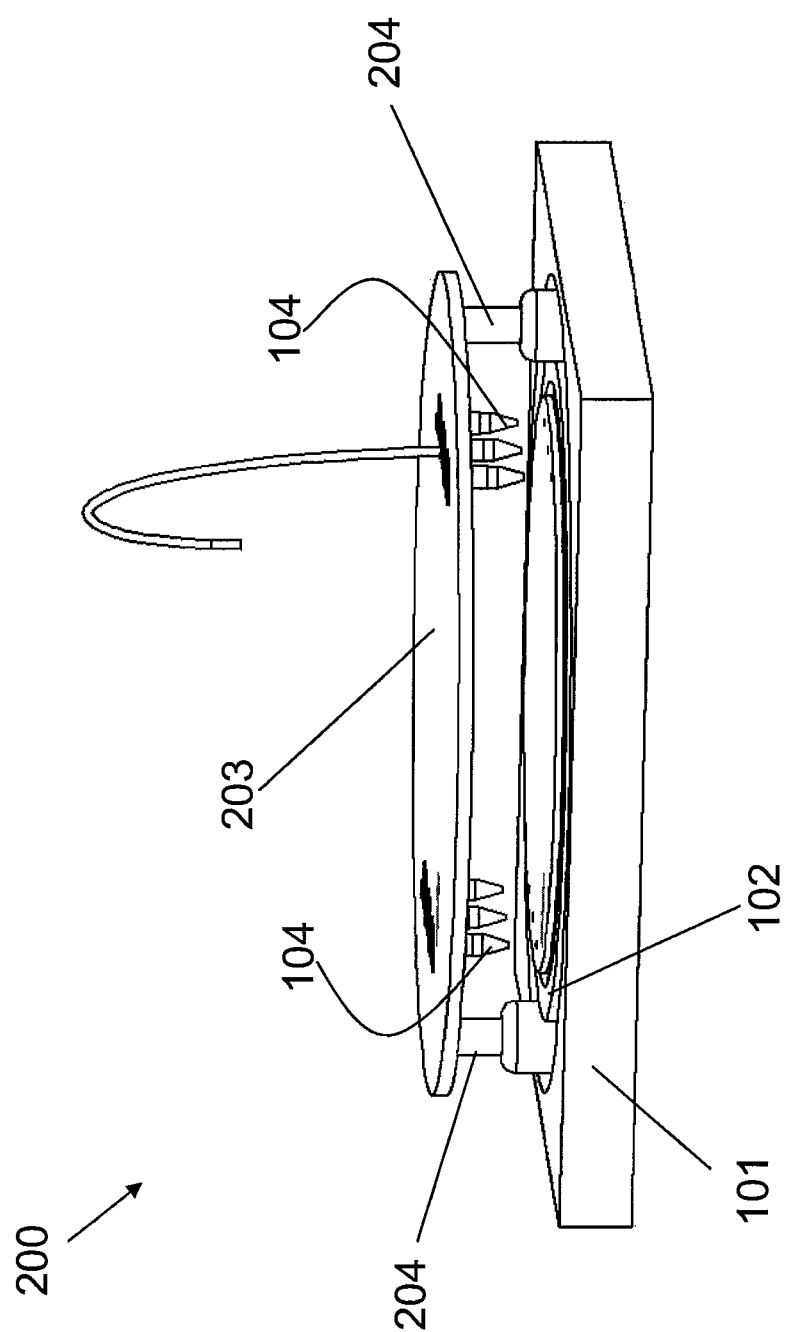
FIG. 5 is an isometric view of a microfluidic system having a connector plate according to one embodiment.

Referring to FIGS. 3 and 4A-4C, there is shown the system for making microfluidic connections according to one embodiment of the present invention. The microfluidic connection system 100 includes a base 101, receiving plate 102 and at least one telescoping arm 103. The receiving plate 102 is fashioned to hold a microfluidic device such as a wafer, die or microchip. In one embodiment, the telescoping arm 103 is an indexing compression arm which not only can be positioned anywhere around the circumference of the chip, but is also telescoping in nature permitting access to ports at any location on the surface of the microfluidic device. In one embodiment the telescoping arm 103 further contains a sealing fitting 104 to create a fluidic seal with the microfluidic device. Although only one fitting is shown on each telescoping arm, it is understood that multiple fittings can be positioned on each control arm without detracting from the invention. To deliver fluid, a fluid source 105 such as a vessel containing liquid is used. In one embodiment, the fluid source is pneumatically pressurized to displace the liquid. In another embodiment a pump is used to transfer the fluid. Preferably, the pressurized vessel contains a backpressure gauge and a liquid flow meter to precisely control the amount of pressure and resulting liquid flow rate. It is understood that any number of telescoping arms can be positioned at the same time. It is further understood that the telescoping arms can be positioned to allow the sealing fitting to address the planar or the features on the edge of a microfluidic device.

Upon placement of a microfluidic device on the receiving plate 102, the telescoping arms 103 lower to compress the sealing fitting 104 against ports in the microfluidic device. The arms may be positioned either manually or in an automated fashion. Optionally, a drive force mechanism applies a pre-determined sealing force. The drive force mechanism may also provide feedback and monitor the sealing force. This drive force can be a spring selected to yield a specific force, a pneumatic cylinder where a given amount of applied gas pressure provides a specific force, an electric motor which applies a certain amount of torque to provide a specific force, or alternatively, the drive force could be hydraulic. Optionally, a load cell or force sensor is placed in-line to provide a continuous force read back.

In one embodiment, the base 101 further contains a circular track 106 to house the telescoping arms 103. The circular track 106 is positioned around the perimeter of the receiving plate 102. The sealing fitting end corresponds to the type of sealing structure required by the microfluidic device. The telescoping arms 103 travel along the circular track 106 to align the sealing fitting 104 with ports on the microfluidic device. In one embodiment, the sealing fittings are pop-off disposable fittings. In another embodiment the sealing fittings are permanently affixed to the telescoping arms. In one embodiment, the sealing fitting further contains a transparent section for use with optical detectors. In yet another embodiment, the sealing fitting contains a port for the inclusion of a chemical detector. In another embodiment the circular track could be linear, curved, or a helix. In yet another embodiment, instead of a track, the device could have an array of holes or slots for placement of the arms.

The telescoping arms allow for the automated connection of sealing fittings to microfluidic devices. Additionally, the telescoping arms are capable of creating high pressure sealing. In one embodiment, the telescoping arms generate a sealing force of at least 15,000 PSI. In another embodiment, the telescoping arm generate a sealing force of at least 100,000 PSI.

The receiving plate optionally includes a holding mechanisms such as, chucks, plates, jigs, for holding the sealing components and the microchip.

According to one aspect, sensors are integrated in the compression system device and the corresponding interconnects are made automatically upon placement of the microchip or fluidic device. Preferably, the sensors operate independent of each other, and software logs critical information and monitors component and system operation where the information may then be used to continue system operation or necessitate component or system shutdown, or automated replacement of the microchip device.

According to one aspect, the connecting and fitting materials include metals, metal mixtures or alloys, glass, ceramic, metal-semiconductor mixtures or alloys, polymers, conductive polymers, carbon or graphite, and mixtures of carbon and polymers or plastics. The fittings can be of any shape so as to configure to the desired connection. Fittings include one or more inlets, outlets, manifolds, tee's, splitters, valves, mixers or other like fluidic components. In one embodiment, the diameter of the tip of the fitting is 500 microns. In another embodiment, a larger gasket having a diameter of about 10 millimeters is used. It is understood that any size fitting can be used to effect a seal to the microfluidic device.

In one embodiment the telescoping arm is engaged via human intervention. In another embodiment, the telescoping arm is engaged in an automated fashion via mechanical, pneumatic, hydraulic, spring, motor, or mechanisms alike. In another embodiment, the compression mechanism is static, constant, or increases/decreases in compression force over time.

In one embodiment, the drive force mechanism is capable of increasing the compressive sealing force if a leak is determined or the chip connections begin to fatigue and leak.

According to one aspect, the electrode supplying the electrical connection to the micro device may consist of a metal, metal mixture or alloy, metal-semiconductor mixture or alloy, conductive polymer, carbon or graphite, and mixtures of carbon and polymers or plastics. The electrode can be of any shape. The electrode surface can be smooth or rough.

According to one aspect, the system accepts microdevices made of metals, metal mixtures or alloys, metal-semiconductor mixtures or alloys, conductive polymers, carbon or graphite, and mixtures of carbon and polymers or plastics. Suitable substrates include silicon, glass, PDMS, polypropylene, Teflon, acetyl, Delrin, acrylic, polyimide, Zeonor, pure polymers, polymer mixtures.

The compression system may have interlocking plug-and-play components or may incorporate fasteners. These plug-and-play components would be easy to exchange, not requiring any tools. Alternatively, tubes are connected to the fitting inlet located in the arms via the traditional thread mechanism.

In one embodiment the system is interfaced with other equipment such as detectors, pumps, auto samplers, laser, light sources, chemistry stations, synthesis stations, washing stations. In another embodiment, the system serves as a probe station for testing, treating, preparing, QC, or chip manufacturing. In a further embodiment, the system includes a machine for performing analytical measurements. In yet another embodiment, the system serves as a high throughput chip measurement system capable of accepting or changing one or more devices.

Optionally, the system further contains electrodes to deliver electrical potentials. The electrodes may be used for testing, chemical reaction monitoring, as part of liquid control or detection. The electrodes are attached to the telescoping arms to allow both liquid and electrical potential through this single mechanism. An electrical potential is applied to the fluid stream being delivered to the microchip through the telescoping arm or the sealing fitting. Insulating material is used to hold the sealing fitting. An electrical lead is attached to the insulating material and positioned to be able to make an electrical contact with the microfluidic device. Optionally, one or more independent telescoping arms may make electrical connections to features on the microfluidic device. In one embodiment, the sealing fitting is made from a conductive material, such as metal, metal alloys or conductive polymers. In another embodiment, electrodes are attached to an additional telescoping arms to allow delivery of electrical potential.

Optionally, leak sensors are integrated in the probe arm to monitor for nanoliter fluid leaks. Preferably, the sensor is inert as to limit interactions or incompatibility with the sample or solution. In one embodiment, the leak sensor is integrated into the monitoring and control electronics of the system to provide instant feedback and initiate adjustments if necessary. The leak sensor may be optically-based (non-contact) or physically-based (contact). The leak sensor may be connected through traditional wired means. Alternatively, the leak sensor communicates through wireless connections via radio frequency, infrared, blue tooth, RFID or other wireless formats.

In one embodiment, the system further includes a microfluidic device loader. The loading being conducted by arm, belt, roller, or feeding system for transferring the microfluidic devices to the sealing unit.

According to one aspect, the sensors may be coated with alternative materials by dipping electrodes into a coating solution or deposited by gas phase deposition. The coating of an electrode may also be made by polymeric or other organic material growth in solution or in gas phase.

In one embodiment, the receiver plate is fashioned to receive a plurality of microfluidic devices. A plurality of microfluidic devices can be housed within a single wafer.

Optionally, the receiver plate includes a positioning sensor to assure proper insertion and alignment of the microfluidic device. In another embodiment, the receiver plate contains auto-insertion hardware for placement of the microfluidic device. The receiver plate may further contain alignment structures for alignment of the microfluidic device. To ensure accurate alignment and precise placement, the receiver plate may be keyed containing physical or optical alignment features.

In one embodiment, the system further includes a brake system for maintaining compression force in the event of loss of force generation. If the power is lost, the brake system engages to ensure that the sealing fitting remains engaged with the microfluidic device.

In one embodiment, the system further includes a receiver plate or microfluidic device substrate holder capable of providing temperature control, including heating, cooling, or ramping temperature.

In one embodiment, the system further includes the capability of mounting optical or electrical components to the base or arms.

The system has utility in various fields. The system is useful in chemical processing platforms for microfluidic devices, such as chemistry treatments, column packings, stationary phases, pre-cursor chemicals, pressure checks, washing, derivitizations, quality control platforms, probe stations, temperature compensation sealing devices, flow chemistry, analytical separations, affinity, Elisa, and colormetric assays. The system further has utility in HPLC, CE, CEC, micelle applications; reversed-phase, normal phase, flash chromatography, supercritical fluid chromatography and affinity; preparative, analytical, micro, nano and pico flow rate chromatography applications; reversed-phase, normal-phase and flash chromatography applications; to pack separation devices, chemical pre-treatment, post-treatment, priming, washing, derivatization, polymerization, modification, grafting, pre-conditioning, and post conditioning; pre-filling and purging devices; interfacing a high and low pressure fluid system to microfluidic devices for subsequent filling with a fluid or particles contained in a fluid.

Referring to FIGS. 5 and 6A-6C, there is shown a system for making microfluidic connections according to another embodiment. The system is similar to that shown in FIG. 3 as described above. The microfluidic connection system 200 includes a base 101, receiving plate 102 and a connector plate 203 having a plurality of sealing fittings 104. The receiving plate 102 is fashioned to hold a microfluidic device such as a wafer, die or microchip. Upon placement of a microfluidic device on the receiving plate 102, the connector plate 203 is attached to a telescoping means 204 that lowers to compress the sealing fittings 104 against ports in the microfluidic device. Optionally, a drive force mechanism applies a pre-determined sealing force. The drive force mechanism may also provide feedback and monitor the sealing force. This drive force can be a spring selected to yield a specific force, a pneumatic cylinder where a given amount of applied gas pressure provides a specific force, an electric motor which applies a certain amount of torque to provide a specific force, or alternatively, the drive force could be hydraulic. Optionally, a load cell or force sensor is placed in-line to provide a continuous force read back.

In one embodiment, the sealing fittings further contain electrical contacts for common application or isolated with individual contact pads. The controlled compression system may close and open allowing for the substrate to be changed. The figures shows a linear array, however, fittings may be placed in any position in the connector plate. In one embodiment, as shown in FIGS. 9A-9B the sealing fittings are along a track in the connector plate, allowing the sealing fitting to travel along the track.

Figure 7:
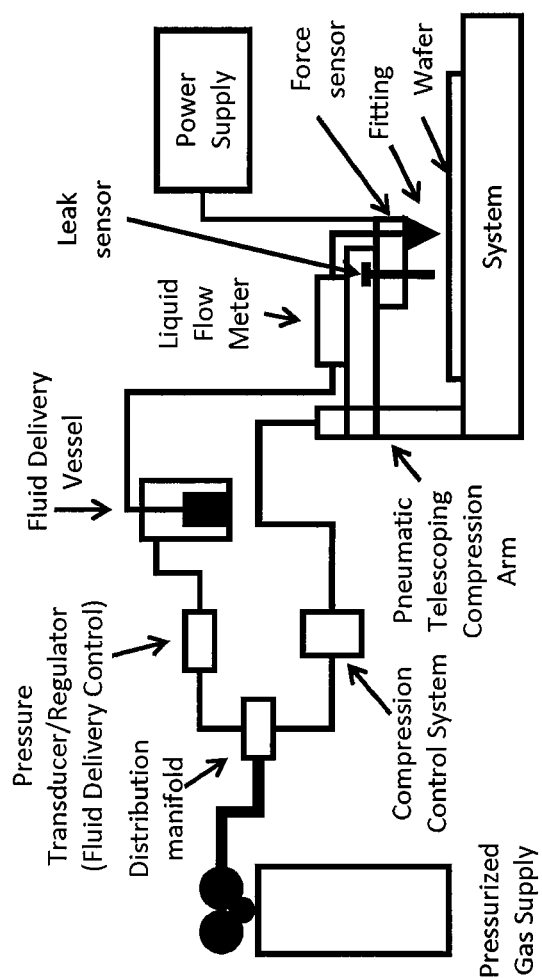
FIG. 7 is a schematic view of a microfluidic system according to one embodiment.

Referring to FIG. 7, there is shown a schematic diagram of the system according to one embodiment. Pressurized gas powers both liquid delivery and the compression sealing system. Liquid flow is adjustable and monitored by a nanoliter liquid flow sensor. The compression sealing force is adjustable and is monitored by a force sensor located above the fitting sealed to the wafer or microchip. Electrical potentials are applied through the telescoping arms and the sealing fitting interface to the microchip. In one embodiment, nanoliter sensitive leaks sensors are integrated in the telescoping arm. Only a single telescoping arm is shown for simplicity, however a plurality of telescoping arms are envisioned.

Figure 8:
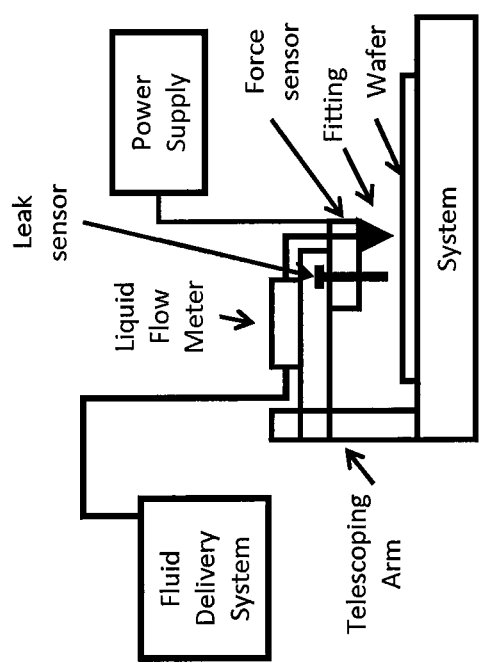
FIG. 8 is a schematic view of a general microfluidic system according to one embodiment.

Referring to FIG. 8, there is shown a schematic diagram of the microfluidic connection system according to another embodiment which does not require pneumatically deliver of liquid. Instead the fluid is pumped from the fluid reservoir to the system, such as from a piston displacement pump.

Figure 9B:
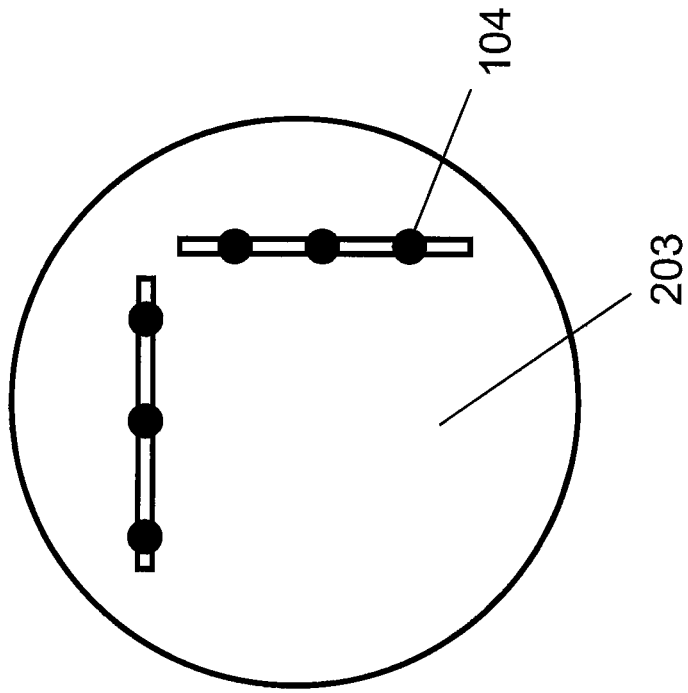
FIGS. 9A-9B demonstrate both a fixed and variable fitting holder for a connector plate used in a microfluidic system according to one embodiment.
Figure 9A:
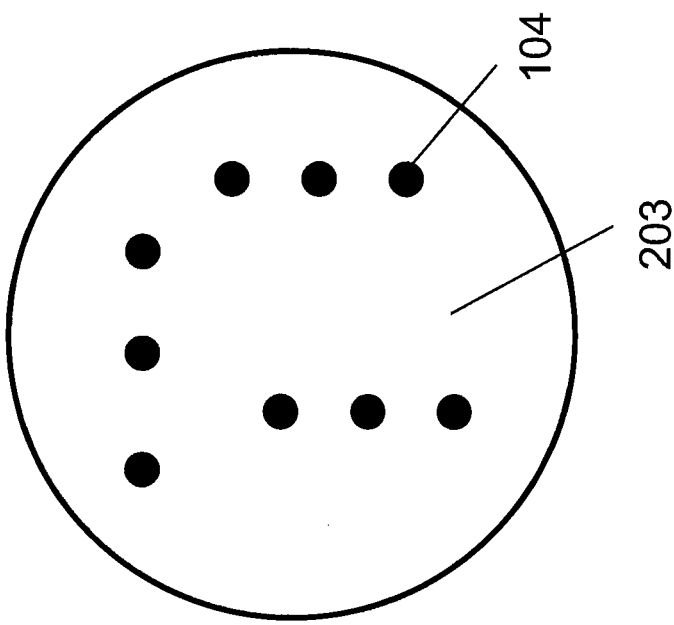

Referring to FIGS. 9A-9B, the connector plate may position fittings in discreet locations (FIG. 9A) or contain fittings in an adjustable track (FIG. 9B), which allows for each fitting to be individually positioned before the compression seal is made.

Figure 10:
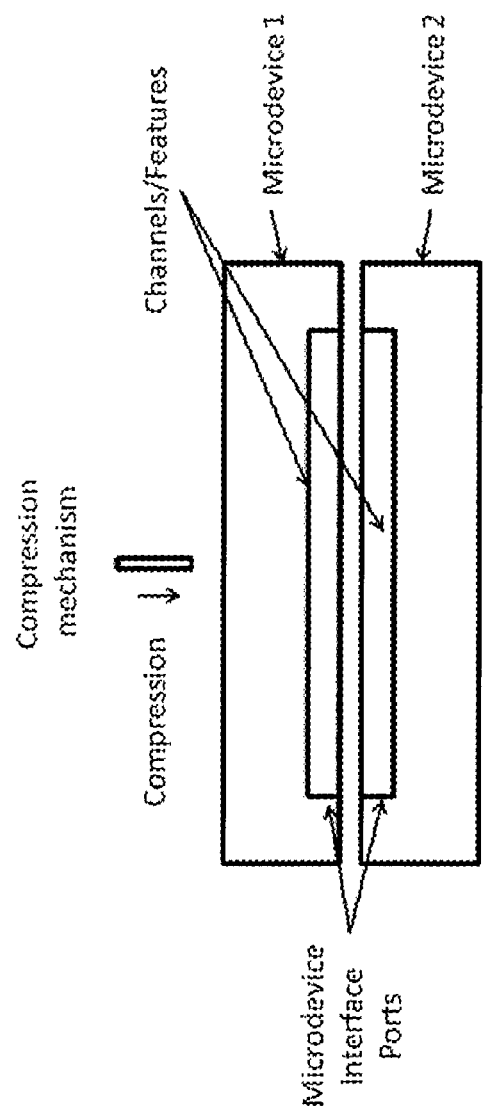
FIG. 10 is a side view of a chip to chip connection according to another embodiment.

Referring to FIG. 10, there is shown a compression mechanism for compressing two microfluidic devices together where the microfluidic devices have corresponding interfacing features.

Referring to FIGS. 11A-11C, there is shown that the sealing may interface at any plane of the device. Top, side(s), bottom. Other angles are also possible. The microfluidic device is supported in the appropriate location in order to apply the force.

Figure 12B:
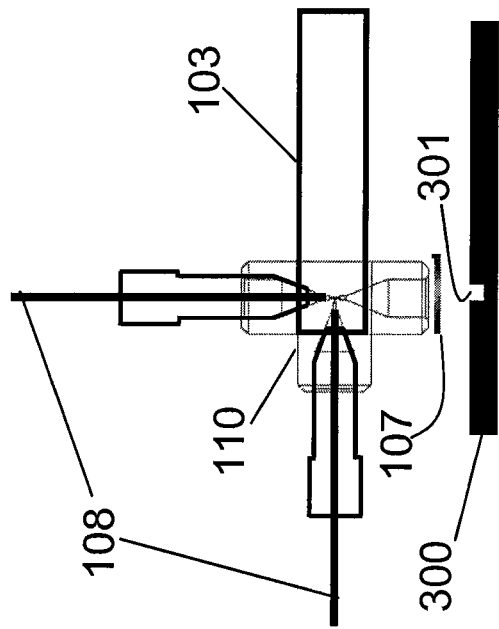
FIGS. 12A-12B demonstrate various systems for interfacing microtubing with a fitting.
Figure 12A:
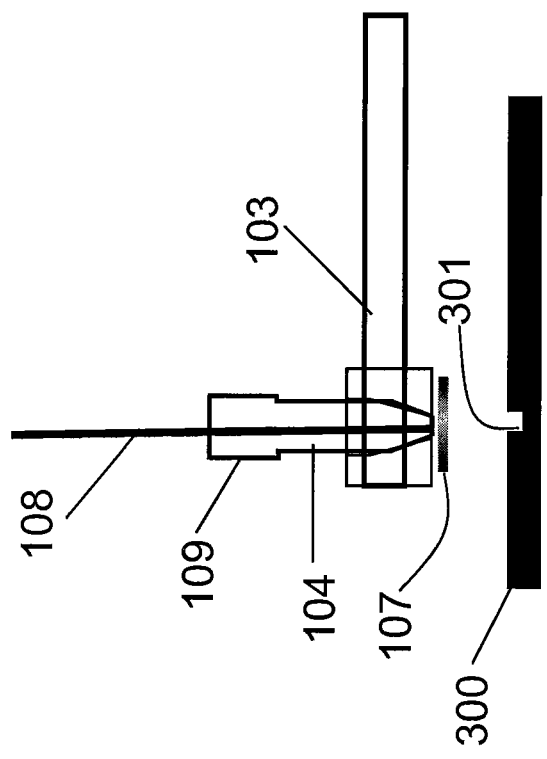

Referring to FIGS. 12A-12B, there is shown various connections of the fluidic tube 108 to the sealing fitting 104. Depending on the fitting, an adapter 109 is used to created a junction between the sealing fitting 104 and the tube 108. As the telescoping arm 103 lowers and brings the fitting 104 close to the microfluidic device 300, the gasket 107 compress to form a connection to the port 301. It is understood that the tube may be attached to the fitting in various ways known in the art. Referring to FIG. 12B, one or more fluid connecting tubes may enter a fitting at any orientation. To illustrate this, a fitting with two inlets 110 is shown. Optionally, the invention could use a manifold with a plurality of inlet or outlet tubes or fittings. In addition to a single inlet feeding a single outlet, a single inlet could feed multiple outlets, multiple inlets could feed a single outlet, or multiple inlets could feed multiple outlets.

Figure 13:
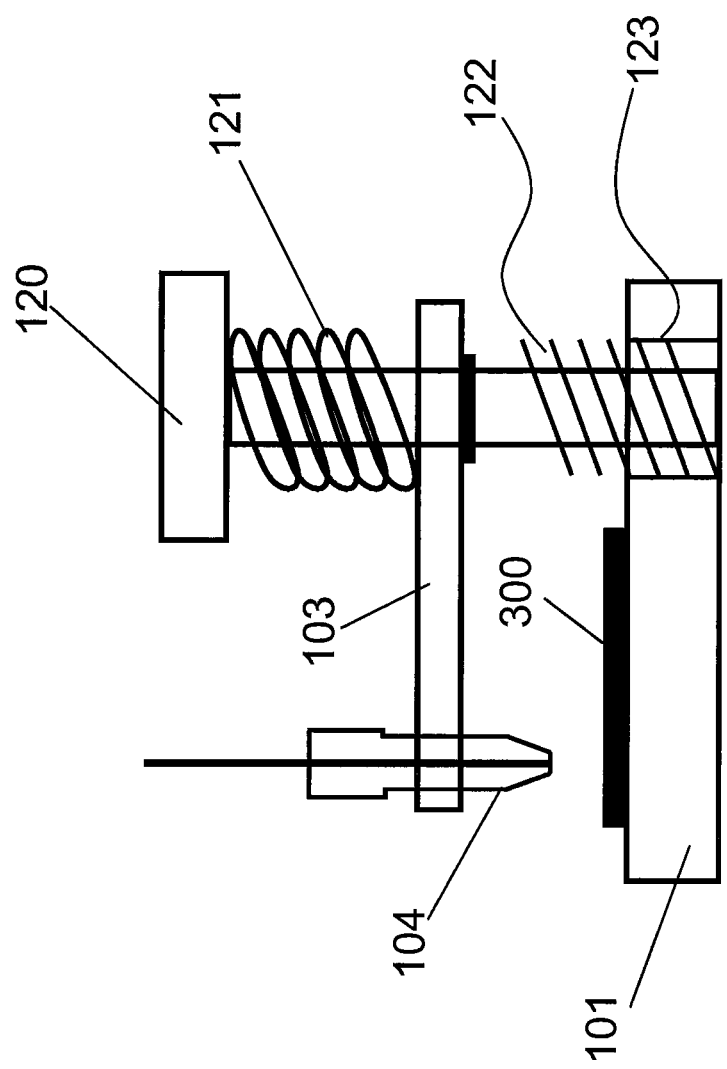
FIG. 13 is a side view of a telescoping arm utilizing spring compression according to one embodiment.
Figure 14:
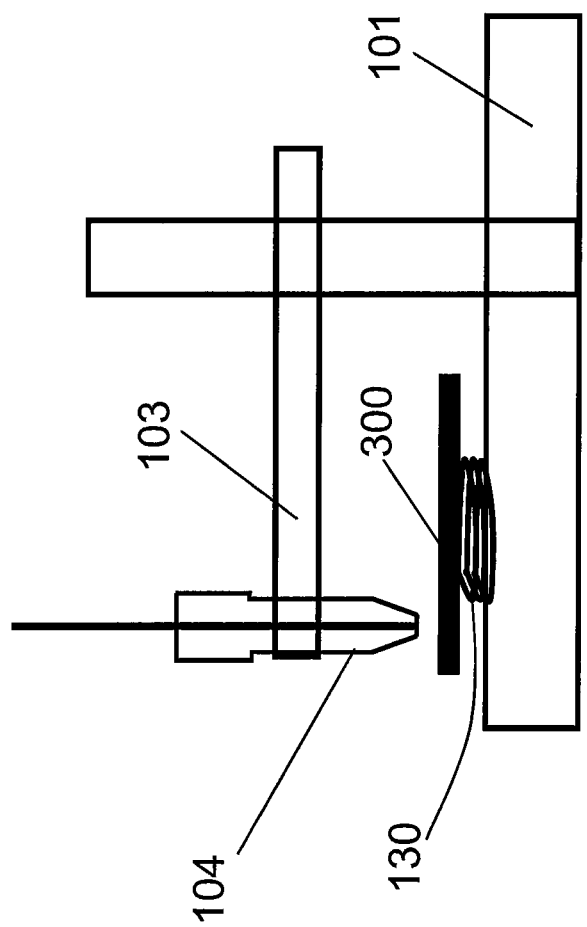
FIG. 14 is a side view receiver plate utilizing spring compression according to one embodiment.

Referring to FIG. 13, in one embodiment the compression force is controlled by a spring. A screw 120 having threads 122 is attached to the telescoping arm 103. Upon turning the screw 120 into the threaded receiver 123 found on the base 101, the spring 121 is compressed to generate a sealing force between the fitting 104 and the microfluidic device 300. The spring 121 can control the arm to compress and seal the fitting 104 to the stationary microfluidic device 300. Alternatively, as shown in FIG. 14, a spring 130 is located on the base 101 to compress and seal the microfluidic device 300 to the stationary sealing fitting 104. Optionally, the spring is selected to deliver a specific force.

Figure 15:
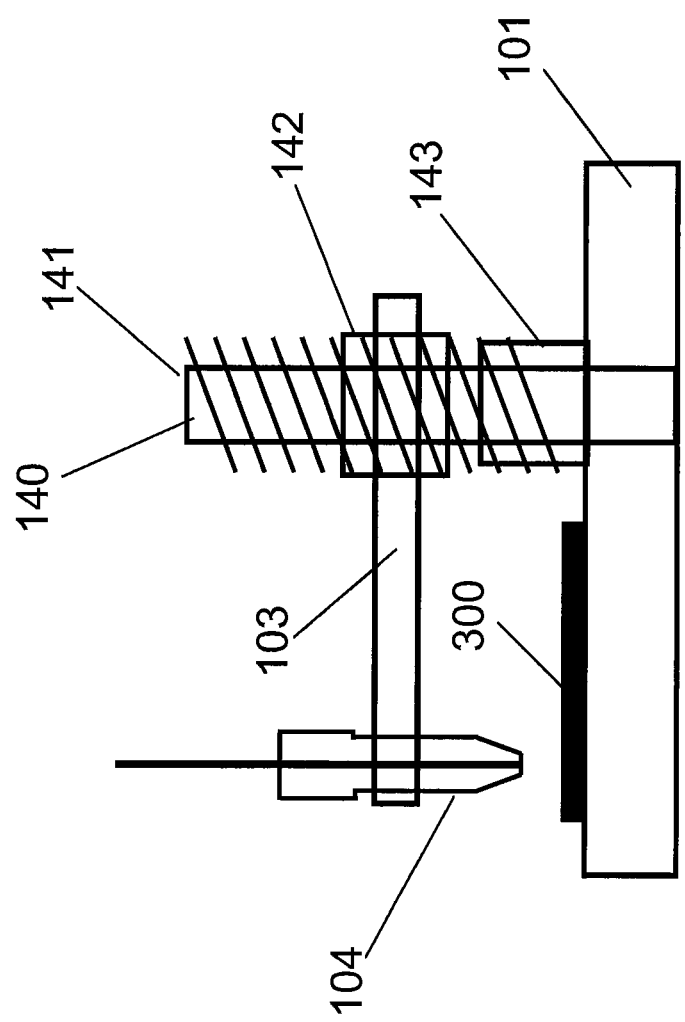
FIG. 15 is a side view of a telescoping arm utilizing motor compression according to one embodiment.
Figure 16:
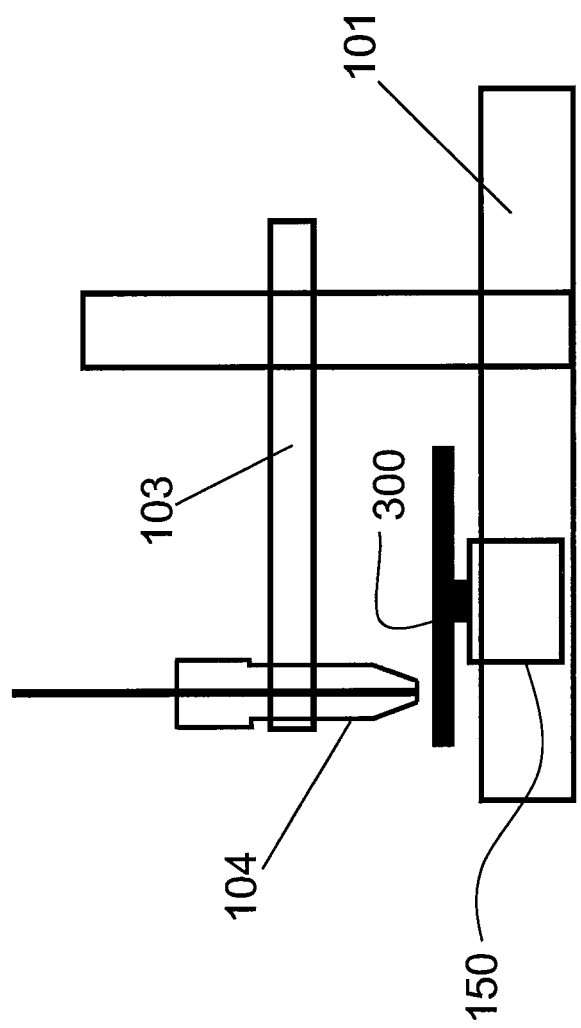
FIG. 16 is a side view of a receiver plate utilizing motor compression according to one embodiment.

Referring to FIG. 15, in one embodiment the compression force is controlled by a motor. An assembly 140 contains a lead screw 141, a bearing 142 and motor 143 to allow travel of the telescoping arm 103. As the motor 143 drives the lead screw 141, the telescoping arm 103 is lowered, thereby compressing and sealing the fitting 104 to the stationary microfluidic device 300. Alternatively, as shown in FIG. 16, a motor 150 is located on the base 101 to compress and seal the microfluidic device 300 to the stationary sealing fitting 104. Optionally, the motor delivers a specific compression force.

Figure 17:
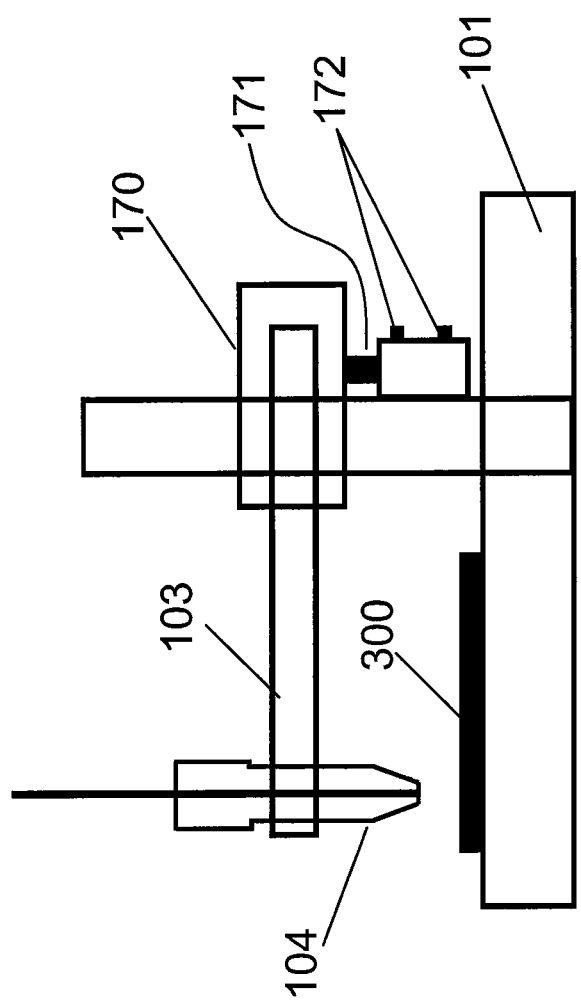
FIG. 17 is a side view of a telescoping arm utilizing pneumatic or hydraulic compression according to one embodiment.
Figure 18:
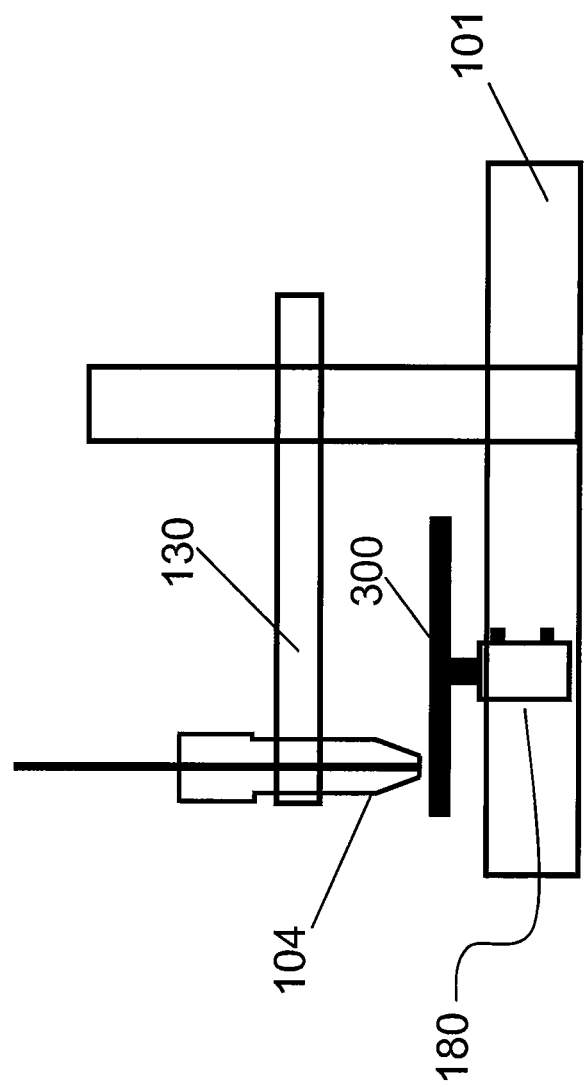
FIG. 18 is a side view of a receiver plate utilizing pneumatic or hydraulic compression according to one embodiment.

Referring to FIG. 17, in one embodiment the compression force is controlled by a pneumatic or hydraulic assembly. An arm support 170 is attached the telescoping arm 103. A cylinder 171 is connected to the arm support 170 at one end and connected to a control unit 172 at the other. The control unit 172 raises and lowers the cylinder 171, thereby allowing movement of the telescoping arm 103. As the telescoping arm 103 is lowered, the fitting 104 is sealed to the microfluidic device 300. Alternatively, as shown in FIG. 18, a pneumatic/hydraulic assembly 180 is located on the base 101 to compress and seal the microfluidic device 300 to the stationary sealing fitting 104. Optionally, the pneumatic/hydraulic delivers a specific compression force.

Figure 19:
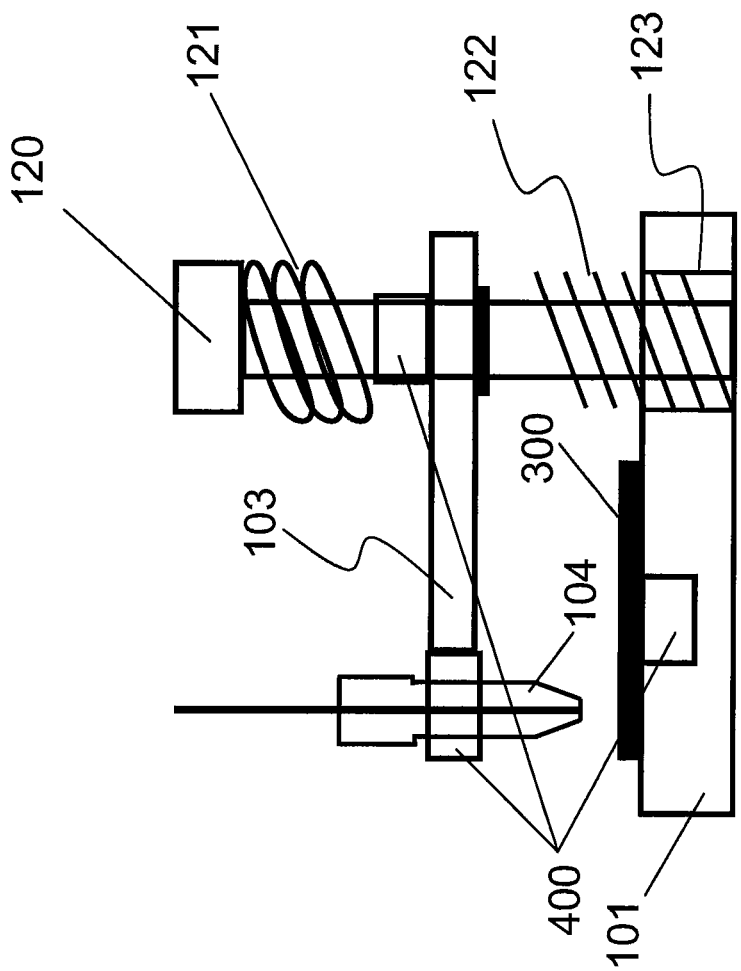
FIG. 19 is a side view of a system utilizing force sensors according to one embodiment.

Referring to FIG. 19, there is shown a system for making microfluidic connections having force sensors 400. It is understood that the force sensors can be implemented into any of the systems discussed above. The force sensors provide continuous compression force feedback, allowing reporting of the sealing force at various locations.

Referring to FIGS. 20A-20F, there are shown a number of suitable sealing fittings. It is understood that the sealing fitting is chosen based on the design of the microfluidic device.

In use, the drive force and sealing fitting create a non-permanent leak-tight connection. The telescoping arm, or connection plate is powered by compressed gas. Preferably, they are constructed with a single action pneumatic cylinder with spring action return. The compression mechanism does not require an electrical power source. The leak-tight seal to the microchip is effected by either an O-ring or a frusto-conical ferrule mechanism. The telescoping arm can be positioned around the circumference of the platform so as to address any port location on the wafer or chip's surface. The potential compression force is greater than is either required or possible with the conventional adhesive O-ring design. An adjustable regulator is in-line for adjusting the pressure to the cylinder and the corresponding force on the fittings. A solenoid valve serves to engage or disengage the pressure. When the cylinder is in the disengaged mode, it is not pressurized, allowing for an internal spring to push the arm upward off the surface of the chip into a non-sealing position. In this position the microchip or fitting type can be changed. The engagement rate of the arm is adjustable via an adjustable in-line aperture on the piston. The piston cylinder may also be fitted with position sensors, allowing a computer or monitoring system to monitor the arm position.

A force sensor is utilized to measure and apply the desired compression force. This allows for direct measurement of the applied force by the compression system. The applied force is measured and displayed on a digital meter or PC. The accuracy read back of the applied force is preferable +/−0.01 lbs. This is a dramatic improvement over the conventional method of hand tightening thread-based fittings where significant user variation occurs due to the manual, hand-based process.

This force detection measurement ability serves as a characterization tool and may serve as part of a feedback system or as a system monitor.

The system is adjustable to accurately provide liquid between 10-10,000 mL/min. A flow sensor capable of measuring flow from 10-10,000 mL/min with a resolution of 1.5 mL/min and read rate of 5 ms to 640 ms is used. Although higher flow rates are possible, here they will be targeted to regimes applicable to CE, CEC, and nanoLC. This sensor is preferably integrated between the fluid delivery device and the telescoping arms sealing fitting, and will monitor the fluid flow from the fluid delivery system. Optionally, the sensor is computer controlled where a pressure transducer linked to the flow sensor is incorporated for remote or automated fluid rate control. An analog or digital signal is monitored or displayed. The sensor is integrated with fittings compatible with fused silica capillary in order to minimize tubing volume. Both flow and pressure sensors may be incorporated.

Optionally, the telescoping arms further allow for the delivery of an electrical potential through the arm mechanism, allowing liquid and/or electrical potential to be supplied via one single mechanism. Nanoliter diagnostic leak sensors are also integrated into the arm. An electrical potential is integrated to the fluid stream being delivered to the microchip through the arm or fitting. The fitting holder on the end of each compression mechanism telescoping arm is constructed of insulating material. The insulating material is machined to hold the fitting used to the seal the inlet tube to the microchip. An electrical lead is anchored to the insulating material and electrical contact is made to the fitting. The fitting itself may be conductive, such as a metal or conductive polymer fitting, or it may have a conductive component, such as a conductive sleeve, ferrule, or O-ring within the fitting, that comes in direct contact with the fluid stream. Alternatively, the tube entering the system has a conductive coating applied to the distal end which is placed in contact with the electrical lead. A voltage power supply is used to provide the electrical potential to the liquid. Optionally, leak sensors are integrated in the probe arms to monitor for nanoliter fluid leaks.

In one use, the sealing fittings are directly compatible with particular microfluidic wafer layouts. For example, the system is designed for use with a commercially available microfluidic chip having a planar inlet and outlet connected via a 100×100 micron channel. The testing consists of placing the chip into the system and inserting fittings into the compression arms. The arms hold liquid delivery capillaries coming from the fluid delivery vessel. Electrical connections to the fitting and its corresponding fluid stream are made automatically through a contact pad integrated in the fitting holder when the fitting is inserted into the arm. The first indexing arm is positioned over the chip channel inlet port, and the arm engages with a sufficient compression force to make a leak-tight seal to the inlet port. At this point the fluid delivery system is pressurized, and the delivery pressure is adjusted to a flow rate of 250 nL/min, as measured by the flow meter. The chip outlet is investigated to ensure liquid is exiting the port. Then a second arm is set up with a fitting and a capillary exiting to a waste vessel. This second arm is positioned at the exit port of the corresponding channel, and the arm engages to make a leak-tight seal to the exit port. Once connections at both the inlet and outlet ends of the channel are made, the set-up is complete and a potential is applied to the inlet port. Testing the system involves observing for leaks, measuring the current at the exit port, determining the maximum pressure the system can hold by plugging the exit port, tuning flow rates, and temperature cycling.

To test electrical potential a DC high voltage power supply applies a voltage through a conductive lead, to a conductive fluid stream of water with 0.1% acetic acid. The outlet fluid is in contact with a conductive union that will in turn be connected to a meter. The current is measured to verify an electrical potential is being applied. Additionally, a second electric test is conducted by generating a nanoelectrospray plume. Here the exit arm fitting holds a 5 micron pulled capillary nanoelectrospray emitter, rather than a simple tube. A counter electrode at ground potential is placed several millimeters from the emitter and a potential of 1.5 kilovolts is applied to the arm at the inlet port. A microscope vision system monitors for the appearance of charged droplets from the nanoelectrospray emitter. The nanoelectrospray process/plume is readily viewable if the electric connection is intact.

To test pressure holding, the outlet of the exit capillary from the second arm is plugged by attaching a union with a plug stop ferrule to the capillary. This serves to seal the stream path, and causes the system pressure to increase until a leak is observed at either the chip's inlet or outlet. Nanoliter sensitive leak detectors are used as a diagnostic for detecting any fluid leaks. System back pressure are also monitored. It is known that frusto-conical seals will hold higher pressures than O-rings, however for certain applications O-rings may be desirable. O-rings are expected to hold 500-1500 PSI depending on the O-ring material, while ferrules sealing with frusto-concial force are expected to hold several thousand PSI and above.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A method for making microfluidic connections comprising the steps of:
   providing a system for making microfluidic connections, said system comprising:
      a base comprising a microfluidic device receiving feature fashioned to hold a microfluidic device,
      a movable device in communication with said base, and
      a sealing component, having a fluid inlet and outlet, attached to said movable device;
   delivering a microfluidic device to said microfluidic device receiving feature of said base, said microfluidic device having at least one fluid port;
   aligning said sealing component and said microfluidic device, wherein the moveable device is capable of adjustably positioning the sealing component relative to the system to access a fluid port located at any position on the microfluidic device and is capable of optical alignment, to bring said sealing component and said at least one fluid port of said microfluidic device into fluid communication; and
   compressing said sealing component and said at least one fluid port into contact thereby forming a microfluidic connection by creating a leak-resistant seal at the interface of said sealing component and said at least one fluid port of said microfluidic device.

2. The method of claim 1 wherein said movable device is a telescoping arm.

3. The method of claim 1 wherein said movable device comprises a plurality of telescoping arms mounted to said base.

4. The method of claim 1 wherein said microfluidic device is a wafer, die or microchip.

5. The method of claim 1 wherein said base further comprises a track, said moveable device is positioned within said track, and aligning comprises moving said moveable device along said track.

6. The method of claim 1 wherein moveable device is a connector plate.

7. The method of claim 1 wherein said moveable device is a compression arm.

8. The method of claim 1 wherein said system further comprises two or more moveable devices.

9. The method of claim 1 wherein said sealing component is selected from the group consisting of a ferrule, a coned port, a flat-bottom fitting, a gasket, an o-ring and a flange.

10. The method of claim 1 wherein compressing said sealing component and said microfluidic device includes a drive mechanism.

11. The method of claim 1 further comprising providing a fluid source in fluid communication with said sealing component.

12. The method of claim 1 wherein said moveable device can travel in any direction relative to the system.

13. The method of claim 1 wherein said system further comprises an electrode attached to said moveable device and said method further comprises applying an electrical potential to said microfluidic device.

14. The method of claim 10 wherein said drive mechanism comprises a dynamic force compensation mechanism.

15. The method of claim 11 wherein said system further comprises:
   a tube connecting said fluid source to said sealing component;
   and wherein said method further comprises transferring fluid from said fluid source, through said tube and said sealing component, to said microfluidic device.

16. The method of claim 10 further comprising measuring with a force sensor the applied force of the drive mechanism compressing said sealing component and said microfluidic device.

17. The method of claim 10 further comprising compressing with a pre-determined force said sealing component and said microfluidic device.

18. The method of claim 1 further comprising placing a leak sensor proximate to an end of said sealing component.

19. The method of claim 1 wherein said aligning said sealing component and said microfluidic device comprises moving the sealing component to a stationary microfluidic device.

20. The method of claim 1 wherein said aligning said sealing component and said microfluidic device comprises moving the microfluidic device to a stationary sealing component.

21. The method of claim 1 wherein the system further comprises a plurality of sealing components attached to said moveable device.

22. The method of claim 1 wherein the system further comprises a fitting, having at least one inlet and at least one outlet, disposed between said moveable device and said sealing component.

* * * * *